(12) United States Patent
Osterberg et al.

(10) Patent No.: US 10,518,759 B2
(45) Date of Patent: Dec. 31, 2019

(54) BRAKE MASTER CYLINDER WITH CURVED LANDS

(71) Applicant: HB Performance Systems, Inc., Mequon, WI (US)

(72) Inventors: Timothy Osterberg, Mequon, WI (US); Randall Holland, Mequon, WI (US)

(73) Assignee: HB Performance Systems, Inc., Mequon, WI (US)

( * ) Notice: Subject to any disclaimer, the term of this patent is extended or adjusted under 35 U.S.C. 154(b) by 77 days.

(21) Appl. No.: 15/829,462

(22) Filed: Dec. 1, 2017

(65) Prior Publication Data

US 2019/0168725 A1    Jun. 6, 2019

(51) Int. Cl.
| | |
|---|---|
| *B60T 11/236* | (2006.01) |
| *F16J 1/02* | (2006.01) |
| *F16J 1/00* | (2006.01) |
| *F15B 7/08* | (2006.01) |

(52) U.S. Cl.
CPC .............. *B60T 11/236* (2013.01); *F15B 7/08* (2013.01); *F16J 1/001* (2013.01); *F16J 1/02* (2013.01)

(58) Field of Classification Search
CPC .... F15B 7/08; F15B 15/1447; F15B 15/1452; F16J 1/001; F16J 1/02; B60T 11/236
See application file for complete search history.

(56) References Cited

U.S. PATENT DOCUMENTS

| | | | | |
|---|---|---|---|---|
| 2,044,379 | A | * | 6/1936 | Brennan ................ F16J 1/00 92/231 |
| 4,106,463 | A | | 8/1978 | Curtis, Jr. et al. |
| 4,428,276 | A | * | 1/1984 | Loveless ............... F16J 15/32 92/175 |
| 4,714,008 | A | * | 12/1987 | Bowers ................. F16J 1/02 92/219 |

(Continued)

FOREIGN PATENT DOCUMENTS

| | | |
|---|---|---|
| EP | 0153594 | 9/1985 |
| EP | 20153594 | 9/1985 |

(Continued)

OTHER PUBLICATIONS

PCT International Search Report for PCT/US2018/63161 dated Feb. 15, 2019; 7 pages.

(Continued)

*Primary Examiner* — Michael Leslie
(74) *Attorney, Agent, or Firm* — Boyle Fredrickson, S.C.

(57) ABSTRACT

A brake master cylinder comprising a housing having an inner surface defining a bore, and a piston movable in the bore along a piston axis. The piston includes two spaced apart lands defining the radially outermost surfaces capable of contacting the inner surface. At least one of the lands is longitudinally curved at the radially outermost surface. For example, the land can be curved at a radius of less than 1 inch (e.g., between 0.15 inch and ⅝ inch) and preferably less than 0.5 inch. In one embodiment, the longitudinally curved land includes two edges that define an axial length of (Continued)

the land. The two edges have a radius of less than 0.2 inch, and preferably about 0.1 inch. The relative position of the edges and lands is such that neither of the two edges is capable of contacting the inner surface of the bore during reciprocating movement of the piston in the bore.

20 Claims, 4 Drawing Sheets

(56) References Cited

U.S. PATENT DOCUMENTS

| | | |
|---|---|---|
| 5,245,913 A | 9/1993 | Kato |
| 5,327,814 A | 7/1994 | Custer et al. |
| 6,012,288 A | 1/2000 | Gualdoni et al. |
| 6,957,605 B1 | 10/2005 | Blume |
| 7,219,641 B2 | 5/2007 | Weinkauf |
| 7,533,649 B2 | 5/2009 | Kemnitz et al. |
| 7,882,940 B2 | 2/2011 | Vezzoli et al. |
| 8,607,689 B2 | 12/2013 | Miller et al. |
| 9,234,451 B2 | 1/2016 | Karch et al. |
| 2009/0288412 A1 | 11/2009 | Bernadat et al. |
| 2012/0085090 A1 | 4/2012 | Gohr et al. |
| 2013/0068095 A1 | 3/2013 | Johansson et al. |
| 2015/0053874 A1* | 2/2015 | Kai .................. F15B 15/1447 251/61.1 |
| 2015/0143991 A1 | 5/2015 | Scheibe et al. |
| 2017/0067523 A1 | 3/2017 | Wegmann et al. |

FOREIGN PATENT DOCUMENTS

| | | |
|---|---|---|
| GB | 1270313 | 4/1972 |
| GB | 1603849 | 12/1981 |

OTHER PUBLICATIONS

PCT Written Opinion for PCT/US2018/63161 dated Feb. 15, 2019; 7 pages.

* cited by examiner

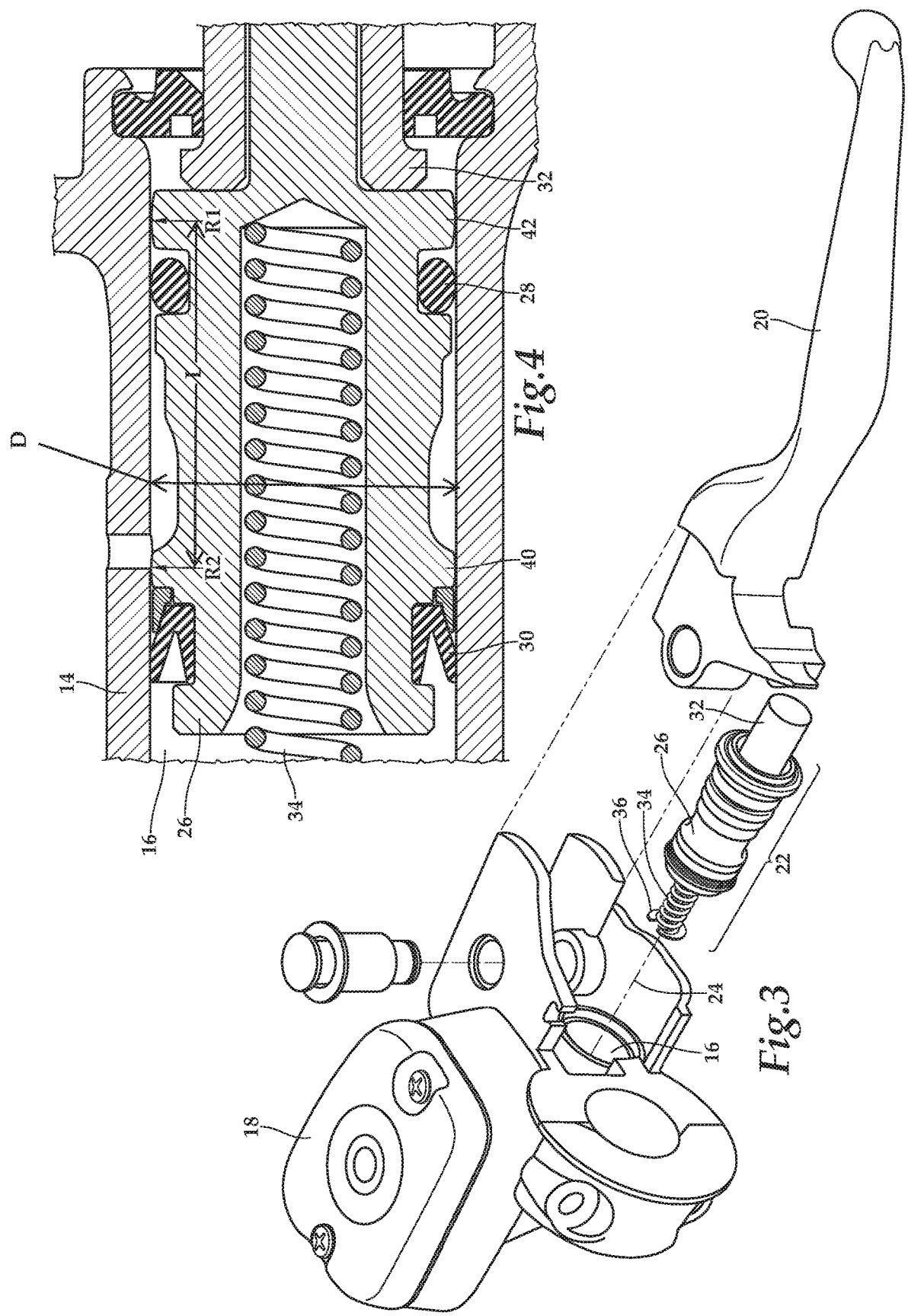

BRAKE MASTER CYLINDER WITH CURVED LANDS

BACKGROUND

The present invention relates generally to hydraulic brake systems and specifically to pistons of master cylinders for such systems.

Hydraulic brake systems are commonly used on vehicles (e.g., automobiles, snowmobiles, ATVs, motorcycles) to provide a braking function. Such systems typically include a master cylinder designed to be moved by the user (e.g., by a foot pedal or hand lever) to pressurize hydraulic fluid and impart motion to brake pads. Master cylinders commonly include a housing defining a bore, and a piston movable in the bore.

The piston has an outer diameter slightly smaller than the inner diameter of the bore so that the piston can reciprocate within the bore. One or more resilient seals are mounted on the piston to seal the gap between the piston and the bore. The sidewalls of the piston adjacent the seal(s) are called the "lands."

In some situations, contact can occur between the lands and the bore. Lubrication at this contact point substantially reduces frictional forces in this situation, but it can be appreciated that further reducing resistance between the piston and bore is desired.

SUMMARY

The present invention provides a brake master cylinder comprising a housing having an inner surface defining a bore (e.g., a substantially cylindrical bore), and a piston positioned in the bore and movable relative to the bore along a piston axis. The piston includes two spaced apart lands defining the radially outermost surfaces capable of contacting the inner surface. At least one of the lands (and preferably both of the lands) is longitudinally curved at the radially outermost surface. For example, the radially outermost surface can be curved at a radius of less than 1 inch (e.g., between 0.15 inch and 0.75 inch) and preferably less than 0.5 inch.

In one embodiment, the longitudinally curved land includes two edges that define an axial length of the land. The two edges have a radius of less than 0.2 inch, and preferably about 0.1 inch. The relative positions of the edges and lands are such that neither of the two edges is capable of contacting the inner surface of the bore during reciprocating movement of the piston in the bore.

Other aspects of the invention will become apparent by consideration of the detailed description and accompanying drawings.

BRIEF DESCRIPTION OF THE DRAWINGS

FIG. 3 is an exploded view of the master cylinder assembly of FIG. 2.

FIG. 4 is a section view taken along line 4-4 in FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
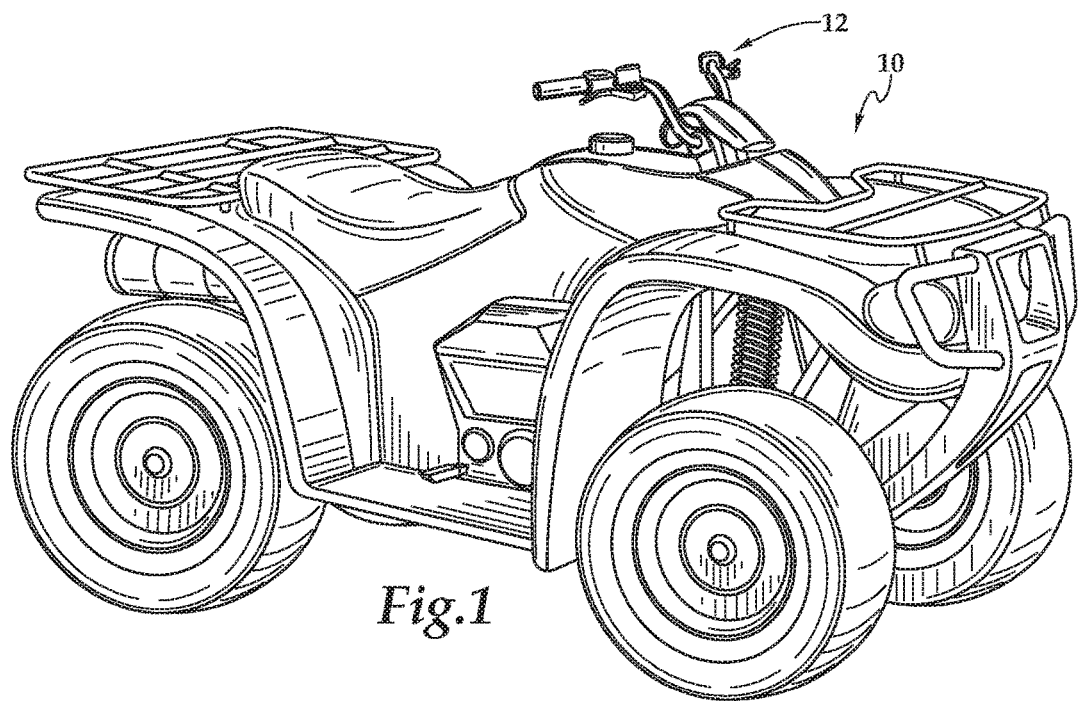
FIG. 1 illustrates an ATV with a brake master cylinder assembly embodying the present invention.

FIG. 1 illustrates an ATV 10 having a master cylinder assembly 12 embodying the present invention. The illustrated master cylinder assembly 12 is used in connection with a braking system to actuate the vehicle brakes. However, it should be understood that the features of the present invention are also applicable to a master cylinder assembly used in connection with other actuating systems, such as transmission clutches.

Figure 2:
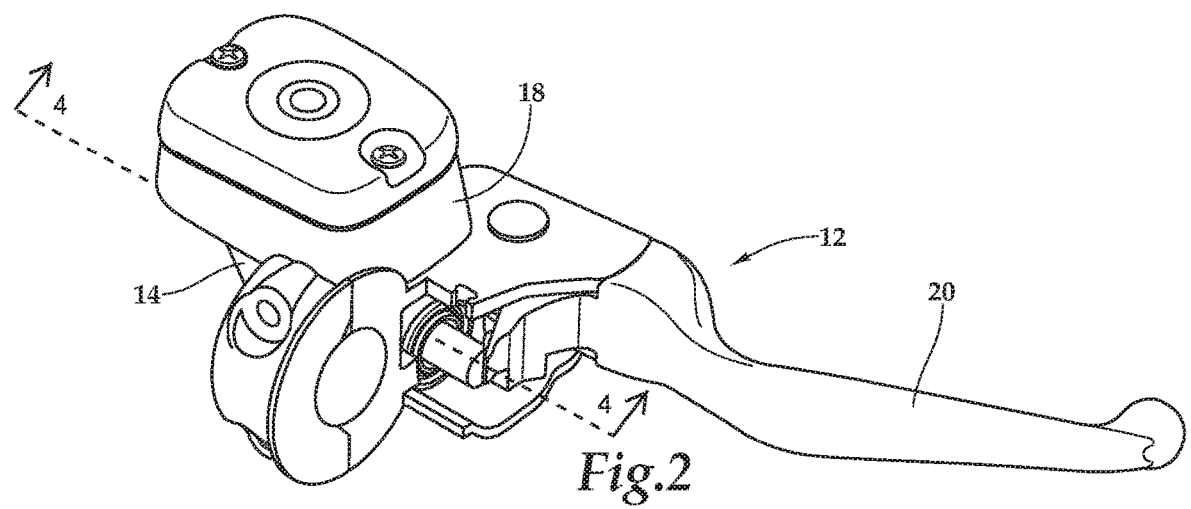
FIG. 2 is a perspective view of the master cylinder assembly of FIG. 1.

Referring to FIGS. 2-3, the illustrated master cylinder assembly 12 includes a cylinder housing 14 defining a bore 16, a fluid reservoir 18 that supplies fluid to the bore 16, and a lever 20 pivotally attached to the housing 14. The lever 20 is positioned to actuate a piston assembly 22 along a piston axis 24 in the bore 16. The illustrated bore 16 has a diameter D of about 11/16 inch.

The piston assembly 22 includes a piston member 26, a piston O-ring 28 mounted on the piston member 26, a piston wiper 30 mounted on the piston member 26, and an end cap 32 removably mounted on one end of the piston member 26. A compression spring 34 and spring retainer 36 are position between the piston member 26 and the bottom of the bore 16 to bias the piston member 26 is a direction out of the bore 16 (i.e., to the right in FIGS. 2-3).

The piston member 26 includes front and rear lands 40,42, which are the radially outermost surfaces of the piston member 26 and position the piston member 26 in the bore 16. The lands 40,42 are spaced along the piston axis 24 to provide contact points between the piston member 26 and the sidewalls defining the bore 16. In the illustrated embodiment, each land 40,42 is an annular member that protrudes radially and has a diameter slightly smaller than the diameter of the bore 16 to provide a stable sliding interface between the piston member 26 and the sidewalls defining the bore to facilitate smooth reciprocating motion of the piston assembly 22 in the bore 16. The illustrated front land 40 has a width W1 of about 0.080 inch, and the illustrated rear land 42 has a width W2 of 0.125 inch. The illustrated lands 40,42 are spaced from each other by a length L of about 0.75 inch.

Figure 5:
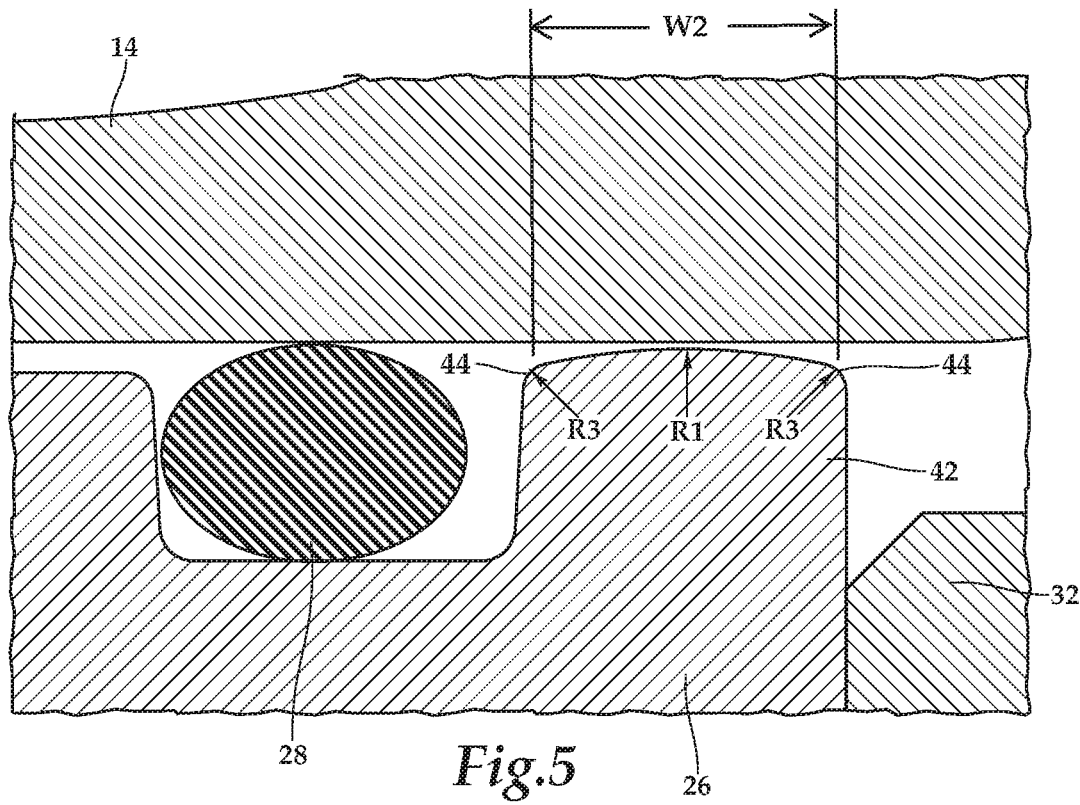
FIG. 5 is an enlargement of a portion of the section view of FIG. 4.
Figure 6:
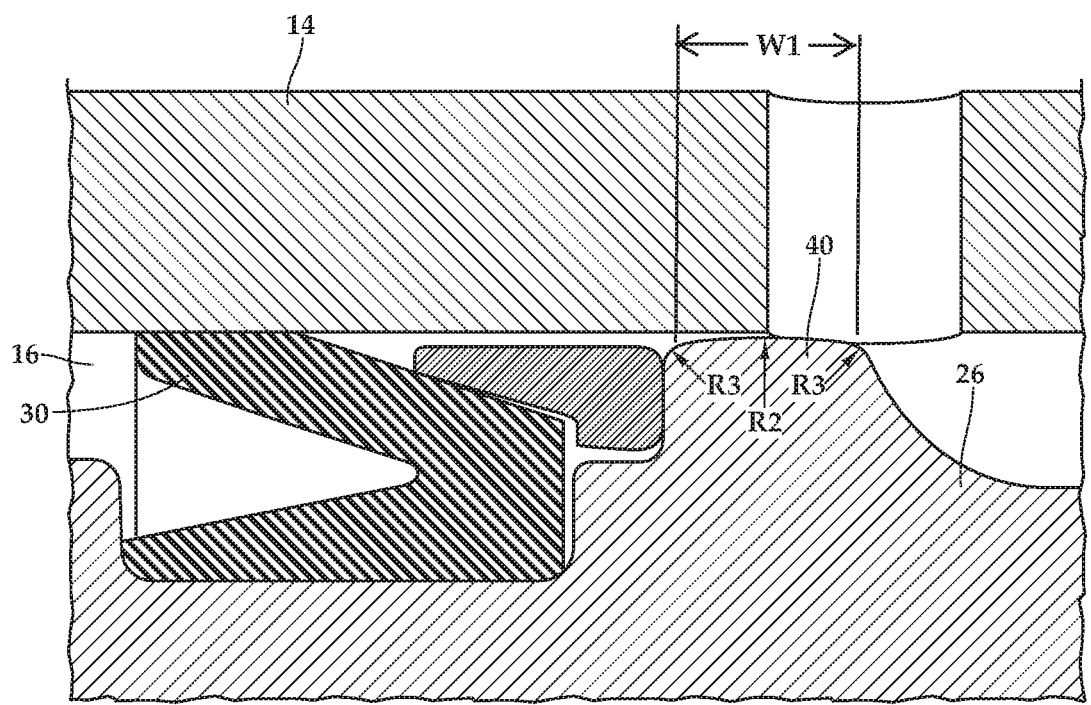
FIG. 6 is an enlargement of another portion of the section view of FIG. 4.

Referring to FIGS. 4-6, the longitudinal cross-section view of the piston shows that each of the lands 40,42 is longitudinally convexly curved. That is, in addition to being convexly curved in the circumferential direction to define the annular shape, each of the illustrated lands 40,42 is convexly curved longitudinally to create a partial torus shape. The partial torus shape provides a large-diameter, curved surface for contacting the inner surface of the bore 16. In the illustrated embodiment, the longitudinal curve of the front land 40 has a radius R2 of 0.25 inches and the longitudinal curve of the rear land 42 has a radius R1 of 0.40 inches.

Based on the above dimensions, it can be seen that the lands each have a radius R1,R2 that is roughly proportional to the width W1,W1 of the corresponding land. Specifically, the illustrated radii R1,R2 are chosen to be about 2-5 times (and preferably 2.5-4 times) the corresponding width W1,W2. In the illustrated embodiment, the radii R1,R2 are about 3.1-3.3 times the corresponding width W1,W2.

This 3.1-3.3 multiplier is related to the length L between the lands. As the length L between the lands increases, the size of the radius on each land can also increase (i.e., the multiplier can increase), all other factors remaining the same. Preferably, the ratio of the multiplier (R/W) to the length L is 3.0 to 5.5, and more preferably 4.0 to 4.5. In the current embodiment, the lands are spaced by a length L of 0.75 inch, and the ratio of the multiplier (R/W) to the length L is about 4.3.

Each illustrated land 40,42 is defined between two edges 44 that define an axial length of each land. The illustrated edges 44 have radii that are smaller than the radii of the longitudinal curve of the corresponding land. In the illustrated embodiment, each of the edges 44 has a radius R3 of about 0.010 inches. It is noted that, because of the longitudinal curvature of the lands 40,42, the corresponding edges 44 are spaced from and do not contact the inner surface of the bore 16.

Figure 7:
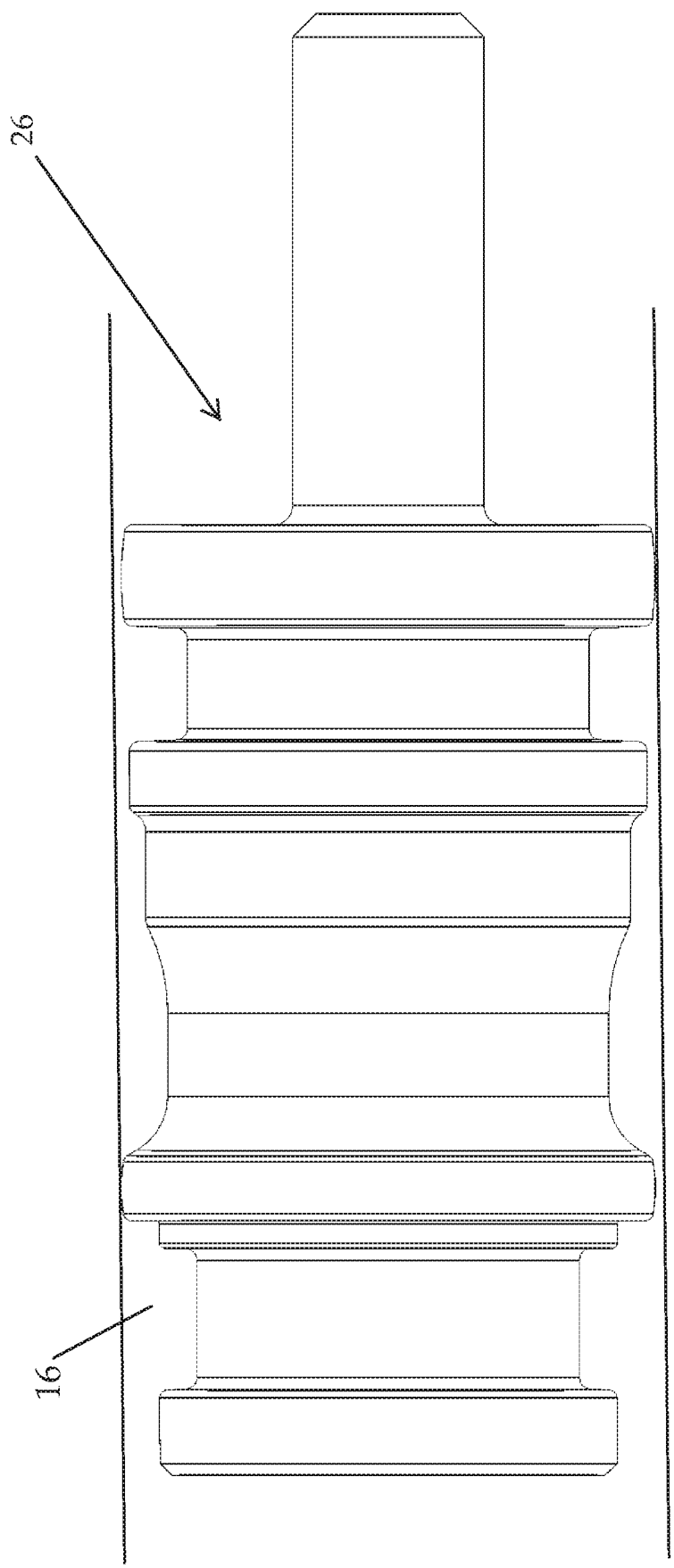
FIG. 7 illustrates a piston member embodying the present invention is an askewed position relative to a bore.

Referring to FIG. 7, by virtue of the illustrated arrangement, the contact between the piston member 26 and the sidewall defining the bore 16 occurs at the large-radii, curved lands 40,42 instead of the small radii, curved edges 44. This is true even when the piston member 26 is askew in the bore 16, as represented schematically in FIG. 7. This increases the effective surface area of the contact and prevents the edges from digging into the inner surface of the bore 16. With pistons that have flat lands and edges with small radii, the edges can come into contact with the bore when the piston member is askew, potentially resulting in increased frictional or resistance to sliding of the piston member 26 in the bore 16.

Various features and advantages of the invention are set forth in the following claims.

The invention claimed is:

1. A brake master cylinder comprising:
 a housing having an inner surface defining a bore; and
 a piston positioned in the bore and movable relative to the bore along a piston axis, the piston including two spaced apart lands defining the radially outermost surfaces capable of contacting the inner surface,
 wherein at least one of the lands is longitudinally curved at the radially outermost surface,
 wherein the at least one land has a width and is longitudinally curved at a radius, and
 wherein the radius is larger than the width by a multiplier of 2.0 to 5.0.

2. A brake master cylinder as claimed in claim 1, wherein the inner surface defines a substantially cylindrical bore.

3. A brake master cylinder as claimed in claim 1, wherein the at least one of the lands comprises a radially outermost surface that is longitudinally curved at a radius of less than 1 inch.

4. A brake master cylinder as claimed in claim 3, wherein the radius is less than 0.5 inch.

5. A brake master cylinder as claimed in claim 3, wherein the radius is between 0.15 inch and 0.75 inch.

6. A brake master cylinder as claimed in claim 1, wherein each of the two lands is longitudinally curved at the radially outermost surface.

7. A brake master cylinder as claimed in claim 1, wherein the at least one of the lands includes two edges that define an axial length of the land.

8. A brake master cylinder as claimed in claim 7, wherein the two edges have a radius of less than 0.2 inches.

9. A brake master cylinder as claimed in claim 8, wherein neither of the two edges is capable of contacting the inner surface during reciprocating movement of the piston in the bore.

10. A brake master cylinder as claimed in claim 1, wherein the multiplier is 3.1 to 3.3.

11. A brake master cylinder as claimed in claim 10, wherein the first and second lands are spaced by a length, and wherein a ratio of the multiplier to the length is 3.0 to 5.5.

12. A brake master cylinder as claimed in claim 11, wherein the ratio is 4.0 to 4.5.

13. A brake master cylinder as claimed in claim 1, wherein one of the spaced apart lands is a first land and the other of the spaced apart lands is a second land, wherein the first land has a first width and is longitudinally curved at a first radius and the second land has a second width and is longitudinally curved at a second radius, and wherein the first radius is larger than the first width by a first multiplier of 2.0 to 5.0, and the second radius is larger than the second width by a second multiplier of 2.0 to 5.0.

14. A brake master cylinder as claimed in claim 13, wherein the first multiplier is 3.1 to 3.3 times the first width and the second multiplier is 3.1 to 3.3 times the second width.

15. A brake master cylinder as claimed in claim 14, wherein the first and second lands are spaced by a length, and wherein a first ratio of the first multiplier to the length is 3.0 to 5.5 and a second ratio of the second multiple to the length is 3.0 to 5.5.

16. A brake master cylinder as claimed in claim 15, wherein first ratio is 4.0 to 4.5 and the second ratio is 4.0 to 4.5.

17. A piston adapted for use in a bore of a brake cylinder housing, the bore having a bore axis and an inner bore diameter, said piston comprising:
 a body having a piston axis and adapted to reciprocally move within the bore of the brake cylinder housing; and
 two lands extending radially from the body, each of the lands terminating radially in a curved surface having two edges and having a diameter that is less than the inner bore diameter;
 wherein when the piston axis is askew in the bore relative to the bore axis, the curved surface of each land prevent the edges from contacting the bore.

18. A piston adapted for use in a bore of a brake cylinder housing as claimed in claim 17 wherein said curved surface is partially toroid shaped.

19. A brake master cylinder comprising:
 a housing having an inner surface defining a bore, a bore axis and an inner bore diameter; and
 a piston positionable and movable within the bore along a piston axis, the piston capable of being askew in the bore such that the piston axis is askew relative to the bore axis, the piston including two annular members providing contact points between the piston and the bore, having a diameter less than the inner bore diameter, and having a radially outermost surface that is partially toroid shaped.

20. A brake master cylinder comprising:
 a housing having an inner surface defining a bore, a bore axis and an inner bore diameter; and
 a piston positionable and movable within the bore, the piston having a piston axis, a body and two members extending radially from the body, each of the members having a diameter that is less than the inner bore diameter and terminating radially in a curved surface having two edges such that when the piston axis is askew relative to the bore axis, the curved surface prevents the edges from contacting the inner surface.

\* \* \* \* \*